United States Patent
Balint et al.

(10) Patent No.: US 9,088,429 B2
(45) Date of Patent: Jul. 21, 2015

(54) METHOD FOR OPERATING, MONITORING AND/OR CONFIGURING AN AUTOMATION SYSTEM OF A TECHNICAL PLANT

(75) Inventors: Thomas Balint, Billigheim (DE); Jörg Bauer, Uttenreuth (DE); Jan Kissling, Graben-Neudorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 360 days.

(21) Appl. No.: 13/522,131

(22) PCT Filed: Jan. 12, 2011

(86) PCT No.: PCT/EP2011/050307
§ 371 (c)(1),
(2), (4) Date: Jul. 13, 2012

(87) PCT Pub. No.: WO2011/086083
PCT Pub. Date: Jul. 21, 2011

(65) Prior Publication Data
US 2012/0290105 A1    Nov. 15, 2012

(30) Foreign Application Priority Data

Jan. 13, 2010 (DE) .......................... 10 2010 000 849

(51) Int. Cl.
*H04L 12/24* (2006.01)
*G05B 19/418* (2006.01)
(Continued)

(52) U.S. Cl.
CPC ............ *H04L 12/24* (2013.01); *G05B 19/4185* (2013.01); *H04L 41/00* (2013.01);
(Continued)

(58) Field of Classification Search
USPC ............ 700/1, 12, 28, 73; 709/288, 224, 217; 370/401
See application file for complete search history.

(56) References Cited

U.S. PATENT DOCUMENTS 6,501,996 B1 * 12/2002 Bieber ............................ 700/19
6,529,780 B1 *  3/2003 Soergel et al. ................... 700/10
(Continued)

FOREIGN PATENT DOCUMENTS

| CN | 1703047 A | 11/2005 | .............. H04L 12/56 |
| CN | 101022359 A | 8/2007 | .............. H04L 12/24 |

(Continued)

OTHER PUBLICATIONS

Chinese Office Action, Application No. 2011800059512, 13 pages, Apr. 30, 2014.
(Continued)

*Primary Examiner* — Kidest Bahta
(74) *Attorney, Agent, or Firm* — Slayden Grubert Beard PLLC

(57) ABSTRACT

A method for operating, monitoring and/or configuring an automation system of a technical plant from a remote device may include a control software ensuring that the software processes of an operating and monitoring software and/or a configuration software relevant for a communication via a public network are terminated. After setting up a secure communication link from the device to the automation system via the public network, an endpoint of the communication link in the remote device is assigned a network address and the software processes of the operating and monitoring software and/or configuration software relevant for a communication via the public network are started. The data packets sent by the operating and monitoring software and/or configuration software for operating, monitoring and/or configuring the automation system are diverted to the network address by the control software.

14 Claims, 1 Drawing Sheet

(51) Int. Cl.
*H04L 29/06* (2006.01)
*H04L 29/08* (2006.01)
*H04L 29/12* (2006.01)

(52) U.S. Cl.
CPC ............ *H04L63/0209* (2013.01); *H04L 63/18* (2013.01); *H04L 67/34* (2013.01); *G05B 2219/31104* (2013.01); *G05B 2219/31186* (2013.01); *H04L 29/12254* (2013.01); *H04L 29/12339* (2013.01); *H04L 61/2038* (2013.01); *H04L 61/2503* (2013.01); *H04L 63/0272* (2013.01); *H04L 63/164* (2013.01); *H04L 67/125* (2013.01)

(56) References Cited

U.S. PATENT DOCUMENTS

| | | | | |
|---|---|---|---|---|
| 7,162,510 | B2 * | 1/2007 | Jammes | 709/203 |
| 7,310,669 | B2 | 12/2007 | Webb et al. | 709/224 |
| 7,389,534 | B1 | 6/2008 | He | 726/15 |
| 7,447,901 | B1 | 11/2008 | Sullenberger | 713/153 |
| 7,530,113 | B2 * | 5/2009 | Braun | 726/28 |
| 7,613,593 | B2 * | 11/2009 | Mikk | 703/1 |
| 7,685,316 | B2 | 3/2010 | Sukumaran | 709/246 |
| 8,190,284 | B1 * | 5/2012 | Herbst et al. | 700/108 |
| 8,214,455 | B2 * | 7/2012 | Baier et al. | 709/217 |
| 8,510,812 | B2 | 8/2013 | Krywaniuk | 726/6 |
| 2002/0007348 | A1 * | 1/2002 | Ali et al. | 705/51 |
| 2004/0053601 | A1 | 3/2004 | Frank et al. | 455/411 |
| 2005/0265366 | A1 | 12/2005 | Ejiri | 370/401 |
| 2006/0089977 | A1 | 4/2006 | Cramer et al. | 709/218 |
| 2007/0143837 | A1 | 6/2007 | Azeez et al. | 726/11 |
| 2008/0192739 | A1 | 8/2008 | Carrasco et al. | 370/389 |
| 2009/0043145 | A1 * | 2/2009 | Rouleau et al. | 585/739 |
| 2009/0316713 | A1 | 12/2009 | Miyabe | 370/412 |
| 2012/0290105 | A1 | 11/2012 | Balint et al. | 700/73 |

FOREIGN PATENT DOCUMENTS

| | | | |
|---|---|---|---|
| DE | 10331309 A1 | 2/2005 | ............. H04L 29/06 |
| EP | 1912381 A1 | 4/2008 | ............. H04L 12/24 |
| WO | 2007/070154 A2 | 6/2007 | ............. G06F 15/16 |
| WO | 2011/086041 A1 | 7/2011 | ............. H04L 12/46 |
| WO | 2011/086083 A2 | 7/2011 | |

OTHER PUBLICATIONS

Zezulka, Frantisek et al., "Virtual Automation Networks—Architectural Principles and the Current State of Development," IEEE Conference Proceedings Articles, XP031410670, 6 pages, 2008.

Lopez, José "Secure M2M Communication with JMC Conciliator," Research Disclosure, Kenneth Mason Publications, 10 pages, Nov. 2009.

German Office Action, Application No. 10 2010 000824.9-31, 4 pages, Oct. 29, 2010.

International Search Report and Written Opinion, Application No. PCT/EP2011/050200, 16 pages, May 13, 2011.

International Search Report and Written Opinion, Application No. PCT/EP2011/050307, 12 pages, Feb. 6, 2012.

Chinese Office Action, Application No. 2011800059508, 11 pages, Jul. 2, 2014.

* cited by examiner

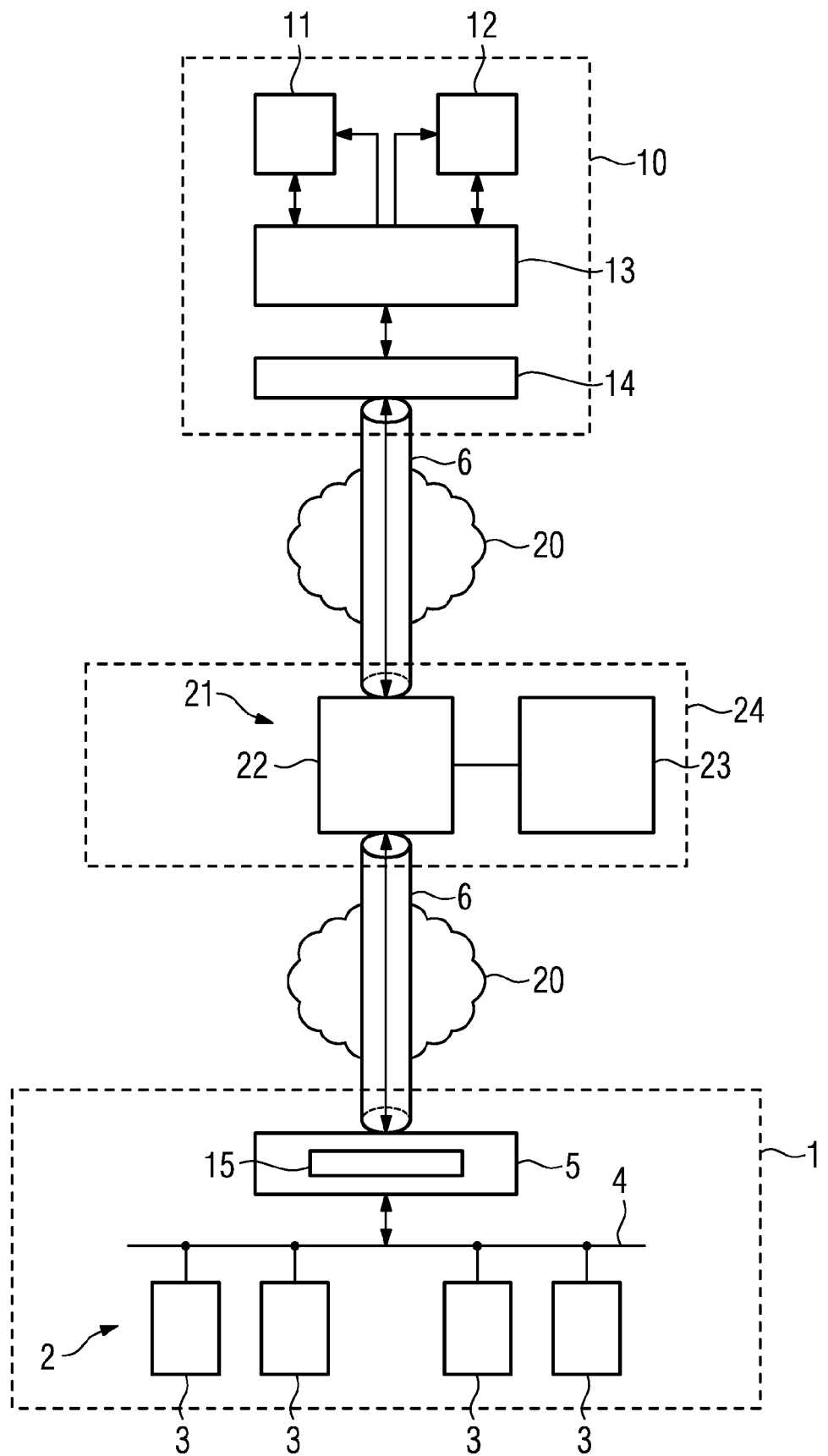

METHOD FOR OPERATING, MONITORING AND/OR CONFIGURING AN AUTOMATION SYSTEM OF A TECHNICAL PLANT

CROSS-REFERENCE TO RELATED APPLICATIONS

This application is a U.S. National Stage Application of International Application No. PCT/EP2011/050307 filed Jan. 12, 2011, which designates the United States of America, and claims priority to DE Patent Application No. 10 2010 000 849.4 filed Jan. 13, 2010. The contents of which are hereby incorporated by reference in their entirety.

TECHNICAL FIELD

This disclosure relates to a method for operating, monitoring and/or configuring an automation system of a technical plant. The disclosure relates further to a control software for implementing such method and a computer program product storing such control software.

BACKGROUND

Various software solutions are already known for the operation, monitoring and/or configuration of an automation system of a technical plant, e.g. of an industrial production plant, a power plant, a freight transport and distribution system or buildings technology in a large building. Examples of well known software solutions are the operating and monitoring software marketed by the applicant under the name "WinCC" and the planning and/or configuration software marketed under the name "Step 7". These software solutions which can be run on a PC are installed for instance on an engineering station (i.e. a PC station for planning the automation system), which is connected to a non-public internal data network (e.g. an industrial Ethernet) of the plant, to which the automation system of the technical plant is also connected. The engineering station in this way comprises a first network address for communication with the network, said network address being addressable by the operating and monitoring software and/or the configuration software for data transfer to the automation system by way of the network. The integrity of the network and the restricted group of employees who have access to the network ensures high IT security and safety.

With the aid of these software solutions, remote services such as for instance remote support, remote control and remote preventive maintenance can also be implemented for the automation system and the plant controlled thereby by way of a public and therefore unsecured network like for instance the Internet. The facility for operating, monitoring and/or configuring the automation system is then remote from the plant. In the event of remote access to the automation system of the plant, the IT security and the safety of the plant must nevertheless be ensured.

In a first known option, the operating and monitoring software and/or the configuration software is installed on the remote facility and the remote link to the automation system is realized with dedicated modem links and layer-2 bridging links. This solution is, as measured by current requirements for IT security and safety, becoming outdated, particularly in the industrial field.

A further option includes the operating and monitoring software and/or the configuration software being installed on a PC station in the plant, for instance an engineering station, which is disposed in the same internal non-public data network as the automation system and in the facility remote from the plant remotely controlling the PC station and the software installed thereupon by means of a terminal session. The remote facility is in this way connected to the PC station by way of the public network by means of an encrypted point-to-point link (e.g. a VPN tunnel). The security in this method is ensured by the integrity of the non-public internal data network and the encrypted point-to-point link. However, this is often associated with additional costs for terminal session programs. Furthermore, PCs are not available in all areas of an automation system.

In order to establish temporarily secure links in a flexible fashion from different locations remote from a plant via a public network like the Internet to an automation system of a technical plant, central and secure communication platforms are already known, like for instance a platform with the name "cRSP" (Common Remote Service Platform) of the applicant. Contrary to simple point-to-point links, such a platform from each Internet terminal enables a secure link to be established with an automation system.

SUMMARY

In one embodiment, a method is provided for operating, monitoring and/or configuring an automation system of a technical plant by a facility remote from the technical plant by way of a secure communication link through a public network, in particular the Internet, wherein the remote facility comprises an operating and monitoring software and/or a configuration software for the automation system and comprises a first network address for communication with the public network, and wherein the first network address can be addressed by means of the operating and monitoring software and/or the configuration software in order to send data via the public network to the automation system. The method may comprise: (a) a control software ensures that the software processes of the operating and monitoring software and/or the configuration software which are relevant to a communication through the public network are terminated, (b) the remote facility establishes a secure communication link from one first terminal point in the facility via the public network to a second terminal point in the automation system, (c) in the remote facility, a second network address ( ) is assigned to the first terminal point, wherein the second network address is different to the first network address, (d) the software processes of the operating and monitoring software and/or the configuration software which are relevant to a communication through the public network are started, (e) the operating and monitoring software and/or the configuration software send/s data packets for operating, monitoring and/or configuration of the automation system to the first network address, (f) the control software routes the data packets sent to the first network address to the second network address.

In a further embodiment, the data packets generated by means of the operating and monitoring software and/or the configuration software for identifying the addressees contain the first network address and in order to redirect the data packets in step f) into the data packets, the first network address is replaced by the second network address. In a further embodiment, in step (a) the software processes of the operating and monitoring software and/or the configuration software which are relevant to a communication through the public network are terminated. In a further embodiment, the public network is the Internet and the network addresses are IP addresses. In a further embodiment, the second network address is a Loopback IP address of the facility. In a further embodiment, the secure communication link runs over a secure communication platform which is connected to the public network. In a further embodiment, a data mirroring occurs on the secure communication platform. In a further embodiment, the secure communication link is a tunnel link.

In another embodiment, a control software is provided for implementing any of the method steps discussed above, the control software configured to implement steps a) and f), and in some embodiments, steps b) and/or d). In another embodiment, a computer program product is provided for storing such control software.

BRIEF DESCRIPTION OF THE DRAWINGS

FIG. 1 shows an technical plant (e.g., an industrial production plant, a power plant, a freight transport and distribution system or the building technology in a large building) having an automation system, according to an example embodiment.

DETAILED DESCRIPTION

Some embodiments provide a secure method for operating, monitoring and/or configuring the automation system of a technical plant over a public and thus non-secure network for a facility remote from a plant in accordance with the preamble of claim 1. Other embodiments provide a control software for implementing such method and a computer program product storing such control software.

In some embodiments, a method may include at least the following steps:
a) a control software ensures that the software processes of the operating and monitoring software and/or the configuration software which are relevant to a communication by means of the public network are terminated,
b) the remote facility establishes a secure communication link from a first terminal point in the facility via the public network to a second terminal point in the automation system,
c) in the remote facility, a second network address is assigned to the first terminal point, wherein the second network address is different from the first network address,
d) the software processes of the operating and monitoring software and/or the configuration software which are relevant to a communication by the public network are started,
e) the operating and monitoring software and/or the configuration software send(s) data packets for operating, monitoring and/or configuring the automation system to the first network address,
f) the control software redirects the data packets sent to the first network address to the second network address.

With certain commercially available operating and monitoring software and/or configuration software, data areas in the sent data packets (in conjunction with the TCP protocol referred to as "ports") are often blocked, which may however be required for a secure link via a public network, e.g., via a secure communication platform. By the software ensuring in a first step that the processes of the operating and monitoring software and/or configuration software which are relevant to a communication by the non-secure network are terminated, these data areas (ports) are released. A secure communication link can then be established with these free data areas (ports) e.g., by way of a secure communication platform. It is only then that the operating and monitoring software and/or configuration software which are relevant to a communication by the public network are started, e.g., similarly by means of the control software. This may also include the start of the entire operating and monitoring software and/or the entire configuration software. Nevertheless, a second network address generated after establishing a link in the remote facility for the first terminal point, in the event of the Internet, e.g., a so-called "Loopback IP address", can be addressed differently from the first network address and therefore often not for data transfer to the automation system via the public network for the operating and monitoring software and/or configuration software. Data packets sent by the operating and monitoring software and/or the configuration software to the first network address for operating, monitoring and/or configuring the automation system are therefore redirected by the control software to the second network address and thus in the secure communication link to the automation system. The control software therefore controls both the occupancy of the data areas (ports) in the data packets generated by the operating and monitoring software and/or the configuration software and also the path of these data packets into the secure communication link. A secure operation, monitoring and/or configuration of an automation system is herewith possible by way of a public network.

The data packets sent by the operating and monitoring software and/or the configuration software for identifying addressees usually contain the first network address. The redirection of the data packets by the control software can then take place particularly easily such that the control software in the data packets replaces the first network address by the second network address.

If the operating and monitoring software and/or the configuration software is/are started prior to establishing a secure link, the software processes of the operating and monitoring software and/or the configuration software which are relevant to a communication by means of the non-secure network may be terminated by the control software in step a).

According to one embodiment, the secure communication link runs here via a secure communication platform, which is connected to the public network. A secure link can herewith be established in the plant from each terminal of the network.

Data mirroring may occur on the secure communication platform in order to further increase the security.

The secure communication link may be a tunnel link, i.e. a link with which identification and authentication of the communication partner takes place and with which the confidentiality of the data (i.e. there is no access to data for third parties) and the integrity of the data (i.e. no change to the data by third parties is possible) is ensured by means of data encryption. A tunnel link of this type is for instance possible by way of the Internet by means of a VPN (Virtual Private Network) link, which uses an Internet security protocol like for instance IPsec (Internet Protocol Security).

Example embodiments are described in more detail below with respect to FIG. 1, which shows a technical plant 1 (e.g. an industrial production plant, a power plant, a freight transport and distribution system or the building technology in a large building) having an automation system 2 for this plant. The automation system 2 may include for instance several automation devices 3, which exchange data with one another via an internal, i.e. non-public network 4 and with an access router 5.

A facility 10 which is remote from the plant 1, for instance an engineering station, comprises an operating and monitoring software 11 for operating and monitoring the automation system 2, a configuration software 12, for instance as an integral part of a planning software, for the automation system and a control software 13. Remote monitoring, remote diagnosis, remote control or remote preventive maintenance is possible for instance by means of the operating and monitoring software 11. Changes to the software of the automation devices 3 (e.g. parameter changes, functional changes, changes in the data communication between the automation devices 3) can be implemented for instance by means of the configuration software 12.

To this end, the facility 13 accesses the automation system 3 by way of the Internet 20, i.e. a public network and an internal access router 5. The facility 10 comprises a first IP address for communication with the internet 20, which can be addressed by the operating and monitoring software 11 and/or the configuration software 12 for sending data via the Internet 20 to the automation system 3.

If an operator of the facility 10 wishes to operate, monitor and/or configure the automation system 2, he/she initially starts the control software 13 by way of a browser for instance. The control software 13 ensures in a first step that the software processes of the operating and monitoring software 11 and/or the configuration software 12 which are relevant to a communication by the Internet 20 are terminated. Provided these processes are already started, these are terminated by the control software 20. Alternatively, the entire operating and monitoring software 11 and/or configuration software 12 can also be terminated by the control software instead of individual processes.

In a second step, a secure communication link 6 in the form of a tunnel link is then established by the control software 20 from the facility 10 via the Internet 20 to the automation system 3. The tunnel link runs here via a secure communication platform 21, e.g. the platform with the name "cRSP" (Common Remote Service Platform) of the applicant.

In order to ensure confidentiality, authenticity and integrity of the communication via the communication link 6, the IPSec protocol may be used. An IPSec terminal point 14 is therefore disposed in the facility 10 and an IPSec terminal point 15 on the side of the plant 1 in the access router 5. The Internet Security Association and Key Management Protocol (ISAKMP) can be used to exchange key information.

The secure communication platform 21 includes an access server 22 and a data server 23. It is disposed in a demilitarized zone 24. The communication link 6 is in this way not "interconnected" in the secure communication platform 21 but is instead interrupted in the access server 22 by a "Reverse Proxy" functionality. A link established out of the plant 1 via the access router 5 or from the facility 10 is terminated in the access server 22. The data sent in this way is stored in the data server 23. The access server 22 then establishes the further link to the facility 10 and/or plant 1 and transmits thereover the data stored in the data server 23.

The incoming communication is thus "mirrored" in the secure communication platform 21. The cited mirroring and the connection setup with plant 1 and/or facility 10 takes place exclusively after successful authentication and authorization on the access router 5, wherein the connection information and passwords required herefor are transmitted in a secured manner.

This architecture offers reliable protection from unauthorized access from a facility 10 in the plant 1 and vice versa, from access from the Internet 20, transmission of viruses and similar damage to facility 10 programs in the plant 1 and vice versa, as well as from the misuse of confidential access data.

The access router 5 monitors authorization of the remote service provider for access to the plant 1. In the event of an authorization, it passes a temporary password to the facility 10 for access to the access server 22. The facility 10 routes access data and the temporary password to the access server 22. The facility 10 requests access to the plant 1 from the access server 22 by specifying its password. The access server 22 compares the password with the password received by the access router 5 and in the event of a match, establishes the communication link 6 into the plant 1.

The termination of the software processes of the operating and monitoring software 11 and/or the configuration software 12 which are relevant to the communication by the Internet 20 ensures in a first step that these do not occupy any ports which are needed for communication via the secure communication platform 21.

A second IP address, e.g., a Loopback IP address, is assigned to the first IPSec terminal point 14 in the facility 10, wherein the second IP address is different from the first IP address. This takes place for instance by means of a Browser, by way of which the operator starts the control software 13 and has thus established the secure communication link 6. The browser looks for a free Loopback IP address and assigns this to the first IPSec terminal point 14.

In a fourth step, the software processes of the operating and monitoring software 11 and/or the configuration software 12 which are relevant to a communication by the Internet 20 are either started manually by means of the operator or automatically by means of the control software 13. These processes nevertheless do not obtain exclusive rights to the ports required for communication by way of the secure communication platform 21.

In a fifth step, the operating and monitoring software 11 and/or the configuration software 12 can now send data packets for operating, monitoring and/or configuring the automation system 3 to the first IP address. The data packets contain this first IP address for addressing purposes. Sending of the data packets directly to the second IP address is often not possible for the operating and monitoring software 11 and/or a configuration software 12 of an automation system, since these can in most instances not communicate with a Loopback IP address. The control software 13 therefore redirects the data packets sent to the first IP address to the second IP address in which they replace the first IP address by the second IP address in the data packets. The data packets are therefore routed into the secure communication link 6. A secure operation, monitoring and/or configuration of the automation system 3 is herewith possible by way of the internet 20.

What is claimed is:

1. A method for operating, monitoring and/or configuring an automation system of a technical plant by a facility remote from the technical plant by way of a secure communication link through a public network, wherein the remote facility comprises remote facility software for operating, monitoring and/or configuring the automation system and comprises a first network address for communication with the public network, and wherein the first network address can be addressed by the remote facility software in order to send data via the public network to the automation system, comprising:
   a) executing, by at least one processor, control software of the remote facility to ensure that software processes of the remote facility software that are relevant to communication through the public network are terminated,
   b) executing, by the at least one processor, the control software of the remote facility to establish a secure communication link from a first terminal point in the remote facility to a second terminal point in the automation system via the public network,
   c) in the remote facility, assigning a second network address to the first terminal point, wherein the second network address is different than the first network address,
   d) executing, by the at least one processor, the control software of the remote facility to start one or more software processes of the remote facility software that are relevant to communication through the public network, e) executing, by the at least one processor, the one or more started software processes of the remote facility software sending data packets for operating, monitoring and/or configuring the automation system to the first network address, and f) the control software routing the data packets sent to the first network address to the second network address, wherein the control software and the one or more software processes are stored in non-transitory computer-readable media of the remote facility.

2. The method of claim 1, wherein the data packets sent by the remote facility software include the first network address, and wherein routing the data packets to the second network address in step f), the control software replaces the first network address in the data packets with the second network address.

3. The method of claim 1, wherein the public network is the Internet and the network addresses are IP addresses.

4. The method of claim 3, wherein the second network address is a Loopback IP address of the facility.

5. The method of claim 1, wherein the secure communication link runs over a secure communication platform that is connected to the public network.

6. The method of claim 5, wherein a data mirroring occurs on the secure communication platform.

7. The method of claim 1, wherein the secure communication link comprises a tunnel link.

8. Control software for facilitating operation, monitoring and/or configuring of an automation system of a technical plant by a facility remote from the technical plant by way of a secure communication link through a public network, the control software configured to interact with software of the remote facility, the control software stored in machine-readable, non-transitory media and when executed by a processor, operable to:

ensure that software processes of the remote facility software that are relevant to communication through the public network are terminated, establish a secure communication link from a first terminal point in the remote facility to a second terminal point in the automation system via the public network, start the software processes of the remote facility software that are relevant to communication through the public network, and for data packets sent by the remote facility to a first network address for operating, monitoring and/or configuring the automation system, redirect such data packets to a second network address assigned to the first terminal point, the second network address being different than the first network address.

9. The control software of claim 8, wherein the data packets sent by the remote facility software include the first network address, and wherein redirecting the data packets to the second network address comprises replacing the first network address in the data packets with the second network address.

10. The control software of claim 8, wherein the public network is the Internet and the network addresses are IP addresses.

11. The control software of claim 10, wherein the second network address is a Loopback IP address of the facility.

12. The control software of claim 8, wherein the secure communication link runs over a secure communication platform that is connected to the public network.

13. The control software of claim 12, wherein a data mirroring occurs on the secure communication platform.

14. The control software of claim 8, wherein the secure communication link comprises a tunnel link.

\* \* \* \* \*